US005493843A

United States Patent [19]

Weder

[11] Patent Number: 5,493,843
[45] Date of Patent: Feb. 27, 1996

[54] SHEETS AND SHEET ROLLS OF WRAPPING MATERIAL HAVING DETACHABLE LABELS

[75] Inventor: Donald E. Weder, Highland, Ill.

[73] Assignee: Highland Supply Corporation, Highland, Ill.

[21] Appl. No.: 67,317

[22] Filed: May 25, 1993

Related U.S. Application Data

[63] Continuation-in-part of Ser. No. 979,510, Nov. 19, 1992, abandoned, Ser. No. 965,585, Oct. 23, 1992, abandoned, and Ser. No. 968,798, Oct. 30, 1992, Pat. No. 5,369,934, which is a continuation of Ser. No. 865,563, May 21, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 965,585, is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ .............................. B65B 51/02; B65B 61/06
[52] U.S. Cl. ................... 53/399; 53/415; 53/465
[58] Field of Search ............................ 53/397, 399, 415, 53/462, 465, 411, 413; 493/53, 55, 93, 154, 187

[56] References Cited

U.S. PATENT DOCUMENTS

| | | | |
|---|---|---|---|
| 2,563,633 | 8/1951 | Amberg | 493/154 |
| 3,027,263 | 3/1962 | Wanamaker | 53/465 |
| 3,232,469 | 2/1966 | Piazze | 493/154 |
| 3,245,697 | 4/1966 | Nugent . | |
| 3,251,141 | 5/1966 | MacRae . | |
| 3,550,421 | 12/1970 | Stakel | 493/154 |
| 3,603,218 | 9/1971 | Ludder | 493/55 |
| 3,800,497 | 4/1974 | Pearson | 53/411 |
| 4,229,925 | 1/1980 | Stirniman | 53/399 |
| 4,546,875 | 10/1985 | Zweber | 53/465 |
| 4,555,025 | 11/1985 | Weinberg | 53/413 |
| 4,846,503 | 7/1989 | Strauss . | |
| 4,972,657 | 11/1990 | McKee | 53/411 |
| 5,005,873 | 4/1991 | West . | |
| 5,005,873 | 4/1991 | West . | |
| 5,073,161 | 12/1991 | Weder et al. | 493/154 |
| 5,109,153 | 4/1992 | Johnsen et al. . | |
| 5,111,637 | 5/1992 | Weder | 53/397 |
| 5,111,638 | 5/1292 | Weder . | |
| 5,172,936 | 12/1992 | Sullivan et al. . | |
| 5,176,609 | 1/1993 | Weder et al. . | |
| 5,181,364 | 1/1993 | Weder . | |
| 5,221,248 | 6/1993 | Weder et al. . | |
| 5,254,072 | 10/1993 | Weder et al. . | |
| 5,286,246 | 2/1994 | Weder et al. . | |
| 5,335,476 | 8/1994 | Weder . | |

FOREIGN PATENT DOCUMENTS 1166692 5/1962 Germany .

OTHER PUBLICATIONS

Brochure, Speedcover, The Original Preformed Pot Cover, 1989 Highland Supply Corporation.
Brochure, Speed Sheets™ and Speed Rolls Pressure Sensitive Floral Wrap, 1990 Highland Supply Corporation.

*Primary Examiner*—Horace M. Culver
*Attorney, Agent, or Firm*—Dunlap & Codding

[57] ABSTRACT

Sheets and rolls of sheets with detachable labels and having a closure bonding material for securing the sheets around items to be wrapped. Spots of closure bonding material may be placed on the detachable labels to hold the detachable labels in a wrapped position. The detachable labels may contain graphical, narrative and bar code information related to pricing, inventory, sales display, product description and care instructions. The sheets may also include detachable sleeves for protecting wrapped items during shipping and handle areas which may be punched out of the sheets for grasping the wrapped items. The handle areas may also contain information similar to that on the detachable labels. Sheets having detachable labels may also be used for forming flower pots or flower pot covers. By providing such labels on the unformed sheets, it is not necessary to add tags or labels after the sheets are formed into flower pots or flower pot covers.

18 Claims, 3 Drawing Sheets

SHEETS AND SHEET ROLLS OF WRAPPING MATERIAL HAVING DETACHABLE LABELS

CROSS-REFERENCE TO RELATED APPLICATIONS

This application is a continuation-in-part of U.S. application Ser. No. 07/979,510, filed Nov. 19, 1992, titled PLANT CARE TAG SYSTEM, now abandoned; and a continuation-in-part of U.S. application Ser. No. 07/965,585, filed Oct. 23, 1992, titled WRAPPING A FLORAL GROUPING WITH SHEETS HAVING ADHESIVE OR COHESIVE MATERIAL APPLIED THERETO, NOW ABANDONED, which is a continuation of U.S. Ser. No. 07/893,586, filed Jun. 2, 1992, NOW ISSUED U.S. PAT. NO. 5,181,364, which is a continuation of U.S. Ser. No. 07/707,417, filed May 28, 1991, now abandoned, which is a continuation of U.S. Ser. No. 07/502,358, filed Mar. 29, 1990, now abandoned, which is a continuation-in-part of U.S. Ser. No. 249,761, filed Sep. 26, 1988, titled METHOD FOR WRAPPING AN OBJECT WITH A MATERIAL HAVING PRESSURE SENSITIVE ADHESIVE THEREON, now abandoned, which is a continuation-in-part of U.S. Ser. No. 219,083, filed Jul. 13, 1988, titled ARTICLE FORMING SYSTEM, now issued U.S. Pat. No. 4,897,031, issued Jan. 30, 1990 to Weder, et al., which is a continuation of U.S. Ser. No. 004,275, filed Jan. 5, 1987, now issued U.S. Pat. No. 4,773,182, issued Sep. 27, 1988, to Weder, et al., which is a continuation of U.S. Ser. No. 613,080, filed May 22, 1984, now abandoned; and a continuation-in-part of application U.S. Ser. No. 07/968,798, filed Oct. 30, 1992, titled METHOD FOR WRAPPING AN OBJECT WITH A MATERIAL HAVING PRESSURE SENSITIVE ADHESIVE THEREON, NOW ISSUED U.S. PAT. NO. 5,369,934, which is a continuation of U.S. application Ser. No. 07/865,563, filed May 21, 1992 titled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, NOW ISSUED U.S. PAT. NO. 5,245,814, which is a continuation of U.S. Ser. No. 649,379, filed Jan. 31, 1991, now issued U.S. Pat. No. 5,111,638 issued May 12, 1992, to Weder titled METHOD FOR WRAPPING AN OBJECT WITH A MATERIAL HAVING PRESSURE SENSITIVE ADHESIVE THEREON, which is a continuation of previously cited U.S. Ser. No. 07/249,761, now abandoned.

BACKGROUND OF THE INVENTION

1. Field of the Invention

The present invention relates generally to sheet wrapping materials and particularly, but not by way of limitation, to sheets and sheet rolls of wrapping material for wrapping floral groupings and for being formed into flower pots and flower pot covers.

2. Description of Related Art

Various wrappings for flowers and potted plants are known in the art. For example, U.S. Pat. Nos. 3,271,922 and 3,508,372 disclose a flexible paper sheet designed to be formed into a protective sleeve around flowers. A potted plant package disclosed by U.S. Pat. No. 4,413,725 has an upper sleeve portion which is removable to display the plant after shipment.

In addition to packaging the product, a vendor typically wishes to display certain information related to the product. Such information may be directed at prospective customers and may include eye-catching designs, illustrations, pricing, text descriptive of the item and instructional material. Other information, such as uniform product codes and bar codes used for pricing and inventory control, may be provided for processing the sale at the check-out counter. In the case of a gift item, such as a plant or floral grouping, it is usually desirable to remove such information before presenting the item as a gift.

SUMMARY OF THE INVENTION

The present invention comprises a sheet of material adapted for packaging an item and having a label area for displaying sales information and data for processing the sale of the item. The label area is designed to be easily detached after the sale.

One object of the present invention is to provide a single sheet of wrapping material which protects the wrapped items and displays information related to the item and the sale of the item.

Another object of the present invention is to provide easy removal of informational and protective portions of the wrapping material after the item has been sold.

Yet another object of the present invention is to provide a sheet of material for forming into a flower pot or flower pot cover having a detachable label.

Other objects, features and advantages of the present invention are apparent from the following detailed description when read in conjunction with the accompanying drawings and appended claims.

DETAILED DESCRIPTION OF THE PREFERRED EMBODIMENTS

Figures 1, 2, 3, 4, 5:
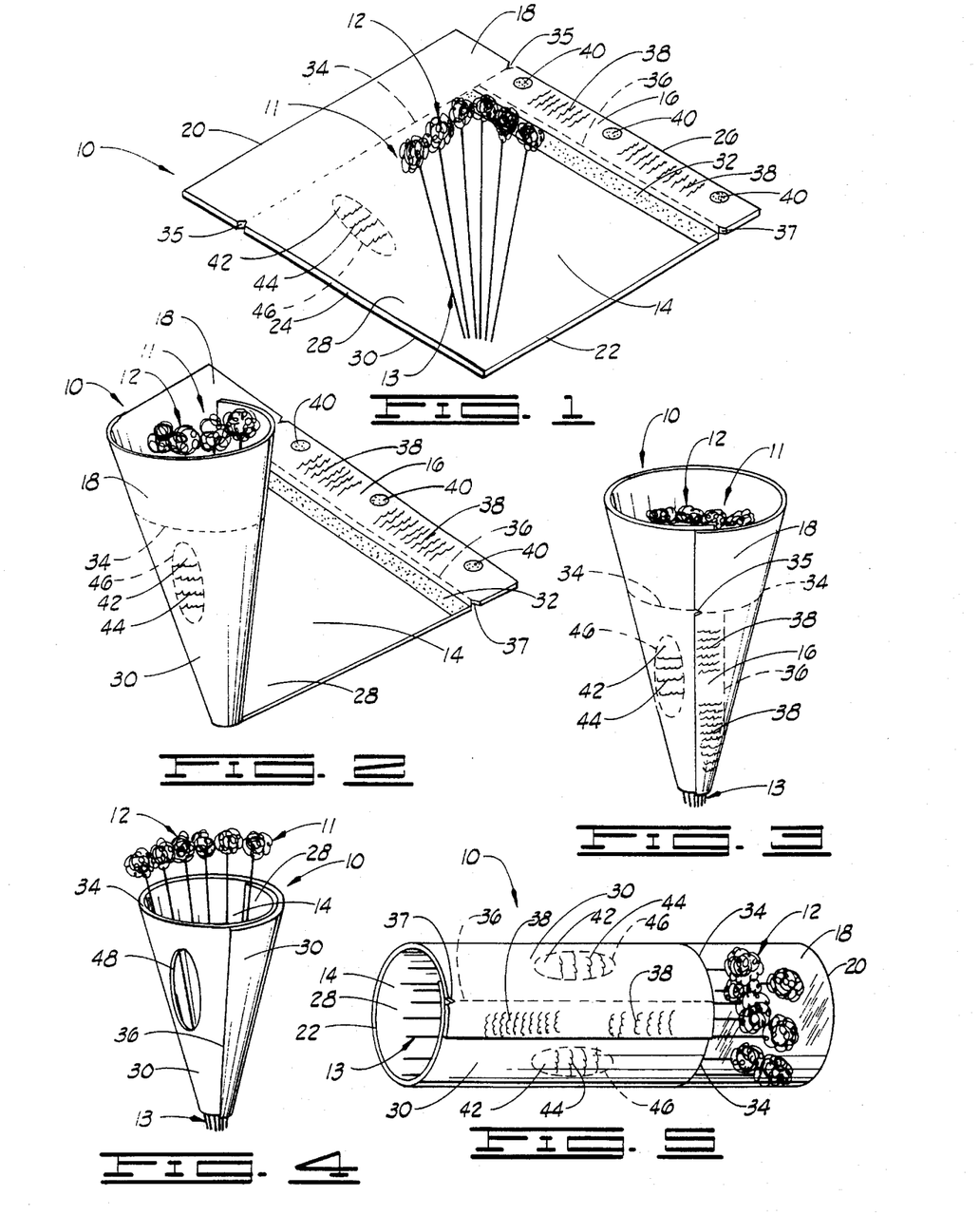
FIG. 1 is a perspective view of a sheet of material constructed in accordance with the present invention and having a floral grouping disposed thereupon.
FIG. 2 is a perspective view of the floral grouping partially wrapped in the sheet of material of FIG. 1.
FIG. 3 is a perspective view of the floral grouping completely wrapped in the sheet of material of FIG. 1.
FIG. 4 is a perspective view of the floral grouping completely wrapped in the sheet of material of FIG. 1 after detachable portions of the sheet of material have been removed.
FIG. 5 is a perspective view of a floral grouping wrapped in the sheet of material of FIG. 1 in a cylindrical manner rather than the conical manner shown in FIGS. 1 through 4.

Referring to the drawings in general, and to FIG. 1 in particular, shown therein and designated by the general reference numeral 10 is a sheet of material for wrapping an item such as a floral grouping 11 having a bloom portion 12 and a stem portion 13. The sheet of material 10 includes a wrapping area 14, a label area 16 and a sleeve area 18.

As used herein, "floral grouping" means cut, fresh flowers, artificial flowers, a single flower, other fresh and/or artificial plants or other floral materials. It should be appreciated that a floral grouping may include other secondary plants and/or ornamentation which add to the esthetics of the overall floral grouping.

The sheet of material 10 includes a first end 20, a second end 22, a first side 24 and a second side 26. The sheet of material 10 also includes an upper surface 28 and a lower surface 30. A closure bonding material 32 is disposed on the upper surface 28 of the sheet of material 10 in the wrapping area 14. As best shown in FIG. 1, the closure bonding material 32 extends from the second end 22 of the sheet of material 10 to the sleeve area 18 generally adjacent to the label area 16.

The sheet of material 10 is constructed from any suitable material that is capable of being wrapped about an item as described herein. Typically, the sheet of material 10 is constructed of a material selected from the group of materials consisting of paper (untreated or treated in any manner), cellophane, metal foil, cloth (natural or synthetic), denim, burlap, polymer films and combinations thereof.

As used herein, the term "polymer film" means any polymer film. For example, but not by way of limitation, one polymer film is a polypropylene film. Another example of a polymer film, but not by way of limitation, is cellophane.

The sheet of material 10 may be constructed of a single layer of material or a plurality of layers of the same or different types of materials. Any thickness of the material 10 may be utilized with the present invention as long as the material 10 is wrappable about an item. Typically, the sheet of material 10 has a thickness in a range from about 0.1 mils to about 5 mils. However, sheets of material 10 up to about 30 mils thick may be used.

Although the sheet of material 10 shown in FIG. 1 is rectangular, the sheet of material 10 may be any shape. For example, the sheet of material 10 may square, rectangular, circular or any other geometric shape. The shape of the sheet of material 10 may even have an irregular, capricious or decorative shape.

As used herein, the term "bonding material" means an adhesive, typically a pressure sensitive adhesive, or a cohesive. Where the bonding material is a cohesive, a similar cohesive material must be placed on the adjacent surface for bondingly contacting and bondingly engaging with the cohesive material. It should be appreciated that the term "bonding material" includes any type of material or thing which can be used to effect the bonding or connecting of the two adjacent portions of the material or sheet of material as described herein.

As illustrated by FIG. 1, the sleeve area 18 extends across the first end 20 of the sheet of material 10. As indicated by dashed line 34, the sheet of material 10 is perforated from the first side 24 to the second side 26 to make the sleeve area 18 readily detachable from the wrapping area 14 and the label area 16.

It should be appreciated that the sleeve area 18 may be made detachable in any suitable manner. For example, the sleeve area 18 may be made detachable by tear-notches, designated by reference numeral 35, at the intersection of the dashed line 34 with the first side 24 and/or second side 26. The sheet of material 10 may be partially cut or reduced in thickness along the dashed line 34 to facilitate tearing along the dashed line 34. With this construction, the tear notch or notches 35 may be used to start the tear. Then the partial cut or reduced thickness may guide the tear as the sleeve area 18 is torn from the remainder of the sheet of material 10.

The sleeve area 18 may also be made readily detachable with use of a bonding material. In utilizing a bonding material, the sleeve area 18 is a separate piece of material which is attached to the wrapping area 14 and the label area 16 by the bonding material along the dashed line 34. With this construction, the bonding material holding the sleeve area 18 to the rest of the sheet 10 should have sufficiently weak bonding strength to allow easy removal of the sleeve area 18.

In similar fashion, the label area 16 is also readily detachable, as indicated by dashed line 36 in FIG. 1. It should be appreciated that the label area 16 may be detachable by means of perforations or a tear notch 37 and tear line 36, similar to those described for the sleeve area 18. Moreover, the label area 16 may be a separate piece of material detachably connected to the wrapping area 14 and sleeve area 18 with a bonding material, as described for holding the sleeve area 18 to the rest of the sheet 10.

The label area 16 displays written and/or graphical information, designated by reference numeral 38, related to the item wrapped or for use in processing the sale of the item. Such information may include, but is not limited to, illustrations of the item, source of the item, pricing, care instructions, product codes or bar codes for pricing and inventory control, advertising and descriptive material.

The information 38 of the label area 16 may appear on the upper surface 28 (as shown in FIG. 1) or on the lower surface 30 (as illustrated by FIGS. 3 and 5). If the information 38 is placed on the upper surface 28, the label area 16 may be bent back along the dashed line 36 to extend radially or angularly from the wrapping area 14 for visual display of the information 38.

If the information 38 is placed on the lower surface 30, it is desirable to maintain closure of the label area 16 against the wrapping area 14, as shown in FIGS. 3 and 5, to display the information 38. In order to effect this closure of the label area 16, a plurality of closure spots 40 are located on the upper surface 28 of the label area 16. A bonding material is disposed on each closure spot 40 to effect closure of the label area 16 against the wrapping area 14.

As shown in FIGS. 1 and 2, the closure spots 40 are spaced apart to provide non-closure areas between the closure spots 40. A pencil or one's fingers may be inserted with ease into the non-closure areas between the label area 16 and the wrapping area 14 to break the hold of the closure spots 40 and to detach the label area 16.

In addition, the bonding material of the closure spots 40 may have weaker bonding strength than the closure bonding material 32 on the wrapping area 14. With this construction, the hold of the closure spots 40 may be broken and the label area 16 may be detached without disturbing the closure of the wrapping area 14 about the items or floral grouping 11.

The sheet of material 10 may also include one or more handle areas 42 located in an interior portion of the wrapping area 14. The handle areas 42 may display additional information 44 of the type placed upon the label area 16. As indicated by dashed lines 46, the outline of the handle area 42 may be perforated to allow the handle area 42 to be punched out or torn out from the sheet of material 10. Punching out the handle area 42 along the perforations 46 results in a carrying aperture 48, shown in FIG. 4, for grasping the wrapped floral grouping 11.

As illustrated by FIG. 5, two spaced apart handle areas 42 may be provided in the wrapping area 14 of the sheet of material 10. By punching out both handle areas 42, two carrying apertures 48 are made for grasping the wrapped sheet of material 10 between thumb and fingers.

To wrap a floral grouping 11 in the sheet of material 10, the floral grouping 11 is placed on the upper surface 28 of the wrapping area 14 of the sheet of material 10, as shown in FIG. 1. The first side 24 of the sheet 10 is extended around the floral grouping 11 to form a substantially conical shape, as illustrated by FIG. 2. Then the second side 26 of the sheet 10 is brought around from the opposite side to complete the formation of the substantially conical wrapping, as depicted in FIG. 3.

After wrapping the sheet 10 around the floral grouping, the closure bonding material 32 is pressed into engagement with a portion of the lower surface 30 of the wrapping area 14 to effect closure of the sheet of material 10 around the floral grouping 11. If desired, the label area 16 is also pressed into engagement with a portion of the lower surface 30 of the wrapping area 14. By doing so, the bonding material of the closure spots 40 bonds with the lower surface 30 the wrapping area 14 effect closure of the label area 16.

When the sheet 10 is wrapped around the floral grouping 11 as shown in FIG. 3, the sleeve area 18 defines a sleeve which supports and protects the bloom portion 12 of the floral grouping 11. Wrapped by the sheet of material 10 in this manner, the floral grouping 11 is protected from damage during shipment, sales display and carrying by the customer.

As shown in FIG. 4, the sleeve area 18, the handle areas 42 and the label area 16 may be easily detached from the sheet of material 10 for displaying the floral grouping 11 or for presenting the floral grouping 11 as a gift. Of course, it is not necessary to remove the sleeve area 18, the handle areas 42 and the label area 16 at all. Moreover, the sleeve area 18, the handle areas 42 and the label area 16 may be detached at different times and for various reasons.

For example, one handle area 42 may be removed by sales personnel at the time of the sale to scan a uniform product code on the handle area 42 through a bar code reader. The handle area 42 punched out by the sales clerk defines a first carrying aperture 48. The other handle area 42 may be punched out by the customer to provide a second carrying aperture 48 for grasping the wrapped material 10. Finally, the sleeve area 18 and label area 16 may be detached by the customer immediately before presenting the floral grouping 11 as a gift.

As illustrated by FIG. 5, the sheet of material 10 may be wrapped around the floral grouping 11 in a substantially cylindrical manner instead of the generally conical shape described hereinabove. It should be appreciated that the cylindrically wrapped sheet 10 possesses the same features and benefits described hereinabove for the conically wrapped sheet 10.

An additional feature of the sheet of material 10 is shown in FIG. 5. The sleeve area 18 may be constructed from a substantially transparent material to allow viewing the bloom portion 12 of the floral grouping 11 through the sleeve area 18. It should be appreciated, however, that the wrapping area 14, the sleeve area 18, the handle areas 42 and the label area 16 may be made of materials which are completely or partially opaque or transparent. In addition, one or more of these areas may be uniform in color or may have many colors and decorative patterns or designs.

Figure 6:
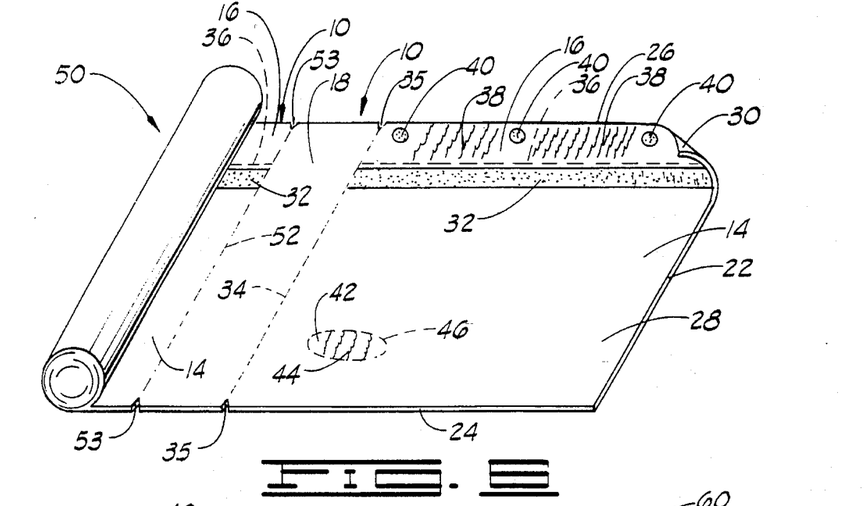
FIG. 6 is a sheet roll of wrapping material constructed in accordance with the present invention.

With reference now to FIG. 6, shown therein and designated by reference numeral 50 is a sheet roll of wrapping material. The sheet roll 50 is made up of a plurality of sheets 10 of wrapping material connected together to form the continuous sheet roll 50.

A perforated line or tear line, indicated by dashed line 52, connects each sheet 10 to the next sheet 10 and allows the sheets 10 to be detached from one another. The perforated line or tear line 52 may have a tear notch 53 at the sides 24 and 26 of the sheets 10. The bonding material 32 on the wrapping area 14 and the label closure spots 40 may be a cohesive material rather than an adhesive material to prevent the sheets 10 from adhering to one another in the sheet roll 10.

In order for cohesive bonding material to effect closure of the wrapping area 14 and the label area 16, an area of cohesive bonding material is disposed on the lower surface 30 of each sheet 10. The area of cohesive bonding material on the lower surface 30 of each sheet 10 is located to make cohesive contact with the bonding material 32 of the wrapping area 14 and the label closure spots 40 when the sheet 10 is wrapped around items as described hereinabove.

Figure 7:
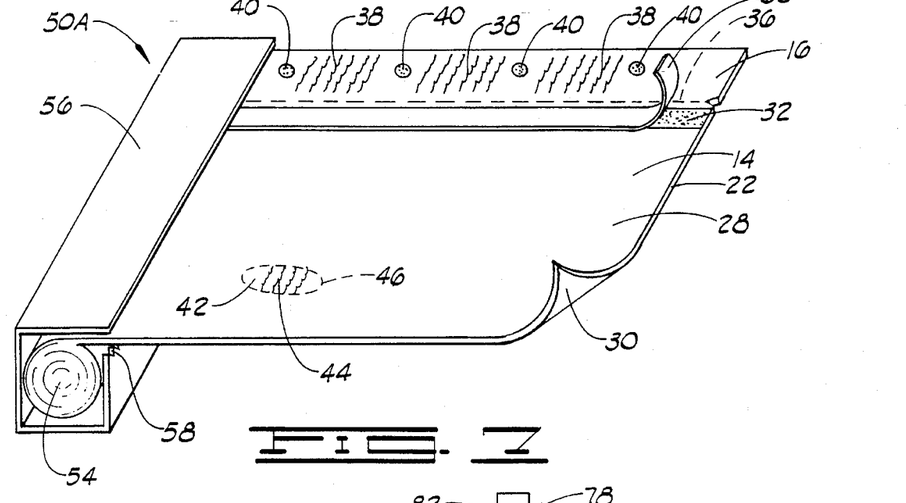
FIG. 7 is an alternate embodiment of a sheet roll of wrapping material constructed in accordance with the present invention.

Referring now to FIG. 7, shown therein and designated by reference numeral 50A is a roll 54 of sheets 10 of wrapping material disposed in a sheet dispenser 56. The dispenser 56 includes a saw-tooth edge 58 for tearing off individual sheets 10 from the roll 54.

As illustrated by FIG. 7, the bonding material 32 on the wrapping area 14 may be an adhesive material. A non-adhesive backing 60 may be disposed over the adhesive bonding material 32 to prevent the layers of sheet material from adhering to one another or to the dispenser 56. The non-adhesive backing 60 is removed before wrapping an item so that the bonding material 32 will adhere to the lower surface 30 of the sheet 10 and effect closure of the sheet 10 around the item.

It should be appreciated that the bonding material of the label closure spots 40 may also be an adhesive substance and that a non-adhesive backing may be used to cover the closure spots 40 when the sheets 10 are rolled up. One strip of non-adhesive material having sufficient width may be used to cover the bonding material on the wrapping area 14 and on the closure spots 40.

Figure 8:
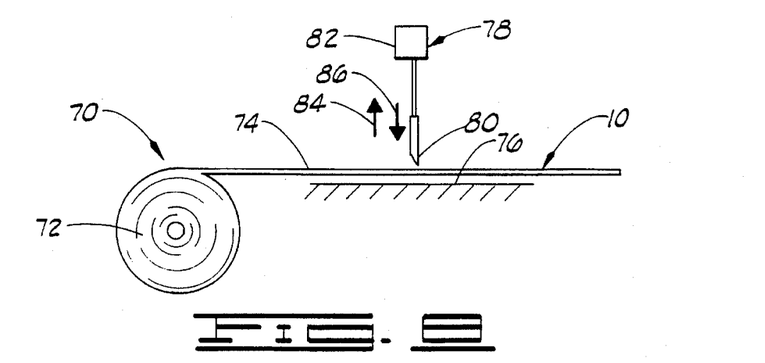
FIG. 8 is partly diagrammatical view of a sheet roll constructed in accordance with the present invention and a knife for cutting the sheet roll into individual wrapping sheets.

With reference now to FIG. 8, shown therein is a system 70 for cutting individual sheets 10 of material from a continuous roll 72 of sheet material 74. The system 70 includes the continuous roll 72, a cutting surface 76 and a cutting knife assembly 78.

The roll 72 of sheet material 74 is supported and adapted for rotation in a conventional manner to feed sheet material 74 over the cutting surface 76. The cutting knife assembly 78 comprises a cutting blade 80 and a conventional mechanism 82 to drive reciprocating movement of the blade 80 as indicated by direction arrows 84 and 86.

It should be appreciated that the system 70 includes suitable control and timing mechanisms (not shown) for metering the sheet material 74 from the roll 72 and for coordinating the movement of the cutting blade 80 to cut off individual sheets 10 of a desired size.

Depending on the type of sheet material 74 and the sharpness of the cutting blade 80, the driving mechanism 82 should direct the cutting blade 80 against the sheet material 74 with sufficient force to cut the material cleanly and completely.

Figures 9, 10, 11:
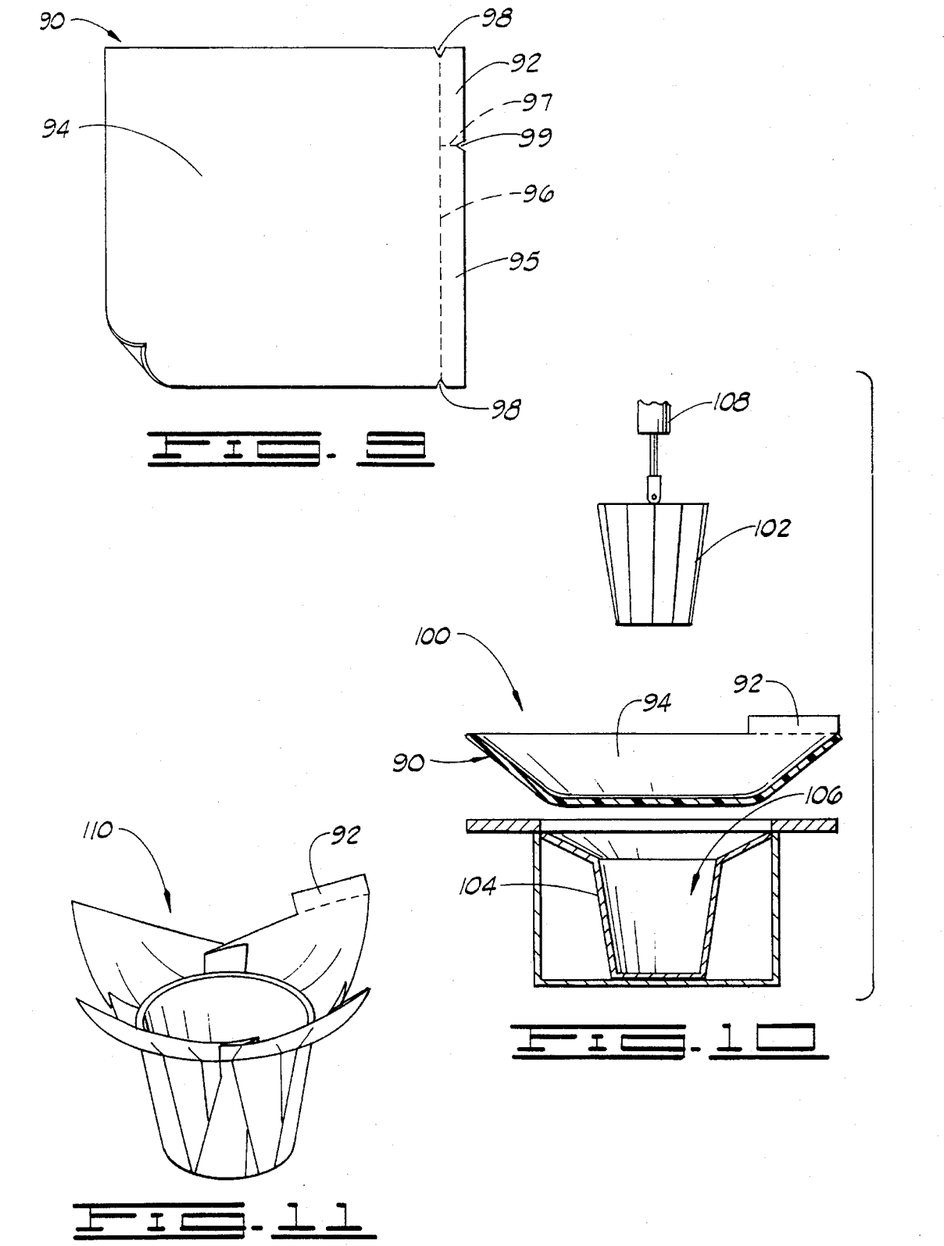
FIG. 9 is a sheet of material constructed in accordance with the present invention for being formed into a flower pot or flower pot cover.
FIG. 10 is a partly diagrammatical side view of an apparatus for forming the sheet of material of FIG. 9 into a flower pot or flower pot cover.
FIG. 11 is a perspective view of the sheet of material of FIG. 9 after being formed into a flower pot or flower pot cover.

Referring now to FIG. 9, shown therein and designated by reference character 90 is a sheet of material for being formed into a flower pot or flower pot cover and having a detachable label 92. The sheet of material 90 may include any combination of the substances and features for sheets of material described hereinabove.

The sheet of material 90 may have virtually any shape which can be formed into a flower pot or flower pot cover. The rectangular sheet 90 shown in FIG. 9 is only one of many examples of the shape which the sheet 90 may have.

The sheet of material 90 includes a main area 94, the label area 92 and a discard area 95. One perforated line or tear line 96 separates the main area 94 from the label area 92 and the discard area 95. Another perforated line or tear line 97 is located between the label area 92 and discard area 95. A tear notch 98 may be provided at either end or at both ends of the perforated line or tear line 96 as a starting aid in tearing off the label area 92 and discard area 95. Another tear notch 99 may be provided to start the tear along the line 97 for separating the discard area 95 from the label area 92.

Turning now to FIG. 10, shown therein and designated by reference numeral 100 is an apparatus for forming the sheet 90 into a flower pot or flower pot cover. The apparatus 100 includes a male mold 102, a female mold 104 having a female opening 106 and a mechanism 108 connected to the male mold 102 for moving the male mold 102 into the female opening 106.

As illustrated by FIG. 10, the discard area 95 of the sheet 90 is typically removed before forming the sheet 90 of material into a flower pot or flower pot cover. The label area 92, however, is left as a part of the sheet 90.

To form the sheet of material into a flower pot or flower pot cover, the sheet 90 of material is disposed over the female opening 106 with the male mold 102 spaced a distance from the female opening 106. Then the male mold 102 is moved into the female opening 106.

As the male mold 102 is moved into the female opening 106, the sheet 90 of material is forced into the female opening 106 and is formed into a flower pot or flower pot cover between the male mold 102 and the female mold 104.

After the forming process, the male mold 102 is withdrawn from the female opening 106. The male mold 102 may be provided with an air/vacuum system so that the flower pot or flower pot cover may be withdrawn from the female opening 106 with the male mold 102. U.S. Pat. No. 4,897,031, entitled "Article Forming System" and issued Jan. 30, 1990 to Weder et al., discloses a suitable forming system with air/vacuum and is hereby incorporated by reference.

A flower pot or flower pot cover 110 formed from the sheet of material 90 is illustrated by FIG. 11. It should be appreciated that the label 92 is a removable part of the sheet 90 throughout the forming process. Accordingly, the flower pot or flower pot cover 110 formed from the sheet 90 already includes the detachable label 92. Thus the flower pot or flower pot cover 110 is ready for display without having to affix additional tags or labels.

The label 92 may include any of the pricing, inventory, descriptive or advertising information which is described hereinabove. Moreover, the label area 92 may comprise a plurality of separately removable labels.

For example, the label area 92 may comprise a vendor label and a customer label. The vendor label, containing bar code, pricing and inventory information, may be removed by a sales clerk when the flower pot or flower pot cover 110 is sold to the purchaser. The customer label, displaying illustrations, descriptions and care instructions, may be removed later by the purchaser of the flower pot or flower pot cover 110.

It should be appreciated that the flower pot or flower pot cover 110 with detachable label 92 may be made in a wide variety of shapes and styles. The particular shape and style of flower pot or flower pot cover 110 shown in FIG. 11 is but one example. By altering the shape of the sheet 90 or the configuration of the male mold 102 and female opening 106, various styles and shapes of flower pots or flower pot covers 110 having detachable labels 92 may be formed.

Changes may be made in the combinations, operations and arrangements of the various parts and elements described herein without departing from the spirit and scope of the invention as defined in the following claims.

What is claimed is:

1. A method of wrapping a floral grouping with a sheet of material, the steps of the method comprising:

providing a sheet roll comprising a plurality of continuous sheets of material, each sheet of material having a wrapping area and a detachable label area, each sheet of material having a bonding material disposed thereupon for securing the wrapping area around a floral grouping;

detaching one of the sheets of material from the sheet roll to provide a detached sheet of material;

placing a floral grouping upon a portion of the wrapping area of the detached sheet of material; and overlapping a portion of the detached sheet of material about the floral grouping and causing the bonding material to bondingly connect to another portion of the sheet of material for securing the sheet of material about the floral grouping, the detachable label area exposed to the outside.

2. The method of claim 1 wherein the step of detaching one of the sheets of material from the sheet roll comprises cutting one the sheets of material from the sheet roll with a blade.

3. The method of claim 1 wherein the step of detaching one of the sheets of material from the sheet roll comprises tearing one the sheets of material from the sheet roll against a saw-tooth edge.

4. The method of claim 1 wherein in the step of providing a sheet roll, the sheet roll comprises:

a perforated edge between each sheet of material making up the sheet roll; and wherein in the detaching step further comprises breaking one of the perforated edges between the sheets of material to detach one of the sheets of material from the sheet roll.

5. The method of claim 1 wherein in the step of providing a sheet roll each label area has a plurality of closure spots having a bonding material disposed thereon; and wherein the overlapping step further comprises wrapping the label area to bring the closure spots into contact with the sheet of material.

6. The method of claim 1 wherein in the step of providing the sheet roll, each sheet of material further comprises a handle area having a perforated outer periphery; and wherein the method comprises the additional step of removing the handle area of the detached sheet of material to provide a carrying aperture for the wrapped floral grouping.

7. The method of claim 6 wherein information related to the floral grouping is displayed upon said handle area.

8. The method of claim 1 wherein the overlapping step includes wrapping the detached sheet of material into a substantially conical shape around the floral grouping.

9. The method of claim 1 wherein the overlapping step includes wrapping the detached sheet of material into a substantially cylindrical shape around the floral grouping.

10. The method of claim 1 wherein in the step of providing the sheet roll, each detachable label area has displayed thereon information related to the floral groupings to be wrapped.

11. The method of claim 10 wherein in the step of providing the sheet roll, the information displayed upon said label area includes a uniform product code.

12. The method of claim 10 wherein in the step of providing the sheet roll, the information displayed upon said label area includes pricing information.

13. The method of claim 1 wherein in the step of providing the sheet roll, each of said label areas has a perforated inner edge for separating said label area from said wrapping area.

14. The method of claim 1 wherein in the step of providing the sheet roll, each of said label areas has a notched inner edge for tearing said label area from said wrapping area.

15. The method of claim 1 wherein in the step of providing the sheet roll each sheet of material further comprises a detachable sleeve area sized and shaped to support a portion of the floral grouping wrapped in said wrapping area.

16. The method of claim 15 wherein said detachable sleeve area has a perforated inner edge for detaching said sleeve area from said wrapping area to display a portion of the floral grouping wrapped in said wrapping area.

17. The method of claim 15 wherein in the step of providing the sheet roll said sleeve area is transparent.

18. The method of claim 1 wherein in the step of providing the sheet roll, the sheet roll is constructed from a material in the group of materials consisting of paper, cellophane, foil, man-made organic polymer film, natural fiber cloth, synthetic fiber cloth, natural fiber burlap and synthetic fiber burlap.

* * * * *

UNITED STATES PATENT AND TRADEMARK OFFICE
CERTIFICATE OF CORRECTION

PATENT NO. : 5,493,843

DATED : February 27, 1996

INVENTOR(S) : Donald E. Weder

It is certified that error appears in the above-identified patent and that said Letters Patent is hereby corrected as shown below:

Cover page, following date filed, please insert --The portion of the term of this patent subsequent to August 9, 2010, has been disclaimed.--

Cover page, References Cited, U.S. PATENT DOCUMENTS, please add the following:

```
--3,271,922    9/1966    Wallerstein
  3,508,372    4/1970    Wallerstein
  4,989,396    2/1991    Weder et al.
  5,007,229    4/1991    Weder et al.--
```

Column 1, lines 33-35, please delete "METHOD FOR WRAPPING AN OBJECT WITH A MATERIAL HAVING PRESSURE SENSITIVE ADHESIVE THEREON" and substitute therefor --METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL--.

Column 1, lines 38-42, please delete "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL" and substitute therefor --METHODS FOR WRAPPING A FLORAL GROUPING--.

Column 2, line 58, after "is" please insert --a--.

UNITED STATES PATENT AND TRADEMARK OFFICE
CERTIFICATE OF CORRECTION

PATENT NO. : 5,493,843
DATED : February 27, 1996
INVENTOR(S) : Donald E. Weder

Page 2 of 2

It is certified that error appears in the above-identified patent and that said Letters Patent is hereby corrected as shown below:

Column 3, line 17, please delete "esthetics" and substitute therefor --aesthetics--.

Column 5, line 33, before "effect" please insert --to--.

Column 8, line 42, after "one" please insert --of--.

Column 8, line 46, after "one" please insert --of--.

Signed and Sealed this

Third Day of September, 1996

Attest:

BRUCE LEHMAN

Attesting Officer        Commissioner of Patents and Trademarks